US006282152B1

(12) United States Patent
Kurple

(10) Patent No.: US 6,282,152 B1
(45) **Date of Patent: *Aug. 28, 2001**

(54) LEARNING SECURITY CONTROL DEVICE

(75) Inventor: William M Kurple, Middlebury, CT (US)

(73) Assignee: Timex Corporation, Middlebury, CT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,936

(22) Filed: Mar. 9, 1999

(51) Int. Cl.[7] .............................. G04B 47/00; G08B 5/22; G08C 19/00; H04B 1/18

(52) U.S. Cl. ................. 368/10; 340/825.44; 340/825.72; 370/313; 455/151.2; 455/151.4

(58) Field of Search ................................. 368/10, 46, 47; 340/825.44, 825.69, 825.71, 825.72; 348/71 LP, 563, 734; 370/313; 455/4.1, 151.4, 151.2, 353, 352

(56) References Cited

U.S. PATENT DOCUMENTS

| | | | | |
|---|---|---|---|---|
| 4,063,410 | | 12/1977 | Welling | 58/38 R |
| 4,283,784 | | 8/1981 | Horan | 368/87 |
| 4,453,161 | | 6/1984 | Lemelson | 340/825.31 |
| 4,626,848 | * | 12/1986 | Ehlers | 340/825.69 |
| 4,780,864 | | 10/1988 | Houlihan | 368/10 |
| 4,783,773 | | 11/1988 | Houlihan et al. | 368/108 |
| 4,825,200 | * | 4/1989 | Evans et al. | 341/23 |
| 4,931,789 | | 6/1990 | Pinnow | 340/825.56 |
| 4,999,622 | | 3/1991 | Amano et al. | 340/825.72 |
| 5,287,109 | * | 2/1994 | Hesse | 341/176 |
| 5,410,326 | * | 4/1995 | Goldstein | 348/134 |
| 5,440,559 | * | 8/1995 | Gaskill | 370/95.1 |
| 5,485,149 | | 1/1996 | Takiguchi et al. | 340/825.69 |
| 5,488,571 | | 1/1996 | Jacobs et al. | 340/705.7 |
| 5,535,147 | | 7/1995 | Jacobs et al. | 364/705.7 |
| 5,555,226 | | 9/1996 | Lizzi | 368/21 |
| 5,559,550 | * | 9/1996 | Mankovitz | 348/6 |
| 5,587,971 | | 12/1996 | Thinesen | 368/70 |
| 5,805,530 | * | 9/1998 | Youngberg | 368/47 |
| 5,815,127 | | 9/1998 | Jacobs et al. | 345/2 |

* cited by examiner

*Primary Examiner*—Vit Miska
(74) *Attorney, Agent, or Firm*—Carmody & Torrance LLP

(57) ABSTRACT

An electronic timepiece having a universal, wireless controller for transmitting wireless signals that control features of a plurality of systems. In a first aspect of the present invention, the electronic timepiece includes a data store which contains a library of control signals. In one embodiment, the library of control signals may be detached from the electronic timepiece so that new control signals may be added to the library. Each of the control signals can be retrieved and transmitted by the universal, wireless controller to emulate a conventional wireless transmitter which controls functions of a corresponding one of the plurality of systems. The electronic timepiece includes the capability for selectively retrieving a control signal for a target system from the library. In one embodiment of the present invention, the selective retrieving is performed in response to input entered through a programmable interface. In a preferred embodiment, the electronic timepiece is a multiple operating mode device where, in a first operating mode, the timepiece displays a time of day and other timepiece-related information and, in a second, emulation operating mode, the timepiece transmits the control signals to control at least one function of a selected one of the plurality of systems. In a second aspect of the present invention, the electronic timepiece includes a learning operating mode. The learning mode electronic timepiece includes a receiver for receiving coded messages, a decoder for decoding the received coded messages and for extracting control signals received therein. The extracted control signals then being added to the library of control signals. In this way, transmissions of a conventional, wireless transmitter can be learned.

15 Claims, 5 Drawing Sheets

LEARNING SECURITY CONTROL DEVICE

FIELD OF THE INVENTION

This invention relates generally to methods and an apparatus for controlling or activating a device and, in particular, to methods and an apparatus for transmitting coded signals to control or to activate preprogrammed features of a device.

BACKGROUND OF THE INVENTION

Wireless security and control systems have been included as features in many products. For example, automobiles and homes often have security systems which allow a user to control an aspect of the security system with a wireless transmitter. The user, for example, employs a wireless transmitter to activate or to deactivate a security and control system to unlock doors, to activate an audible alarm, or to activate a remote vehicle starter, just to name a few. These wireless transmitters may be in the form of a key FOB. The wireless transmitter may include, for example, a radio transmitter, an encoder and a battery disposed in a housing that the user attaches to a key chain. The user operates the wireless transmitter to transmit coded signals to the security and control system which activates or deactivates preprogrammed features of the system.

Systems which employ the above described wireless transmitter have gained broad acceptance and it is not uncommon for a user to have multiple wireless transmitters to activate or to control many different systems. For example, users may use a wireless transmitter to control a security system in each car they own and use another wireless transmitter to control a security system installed in their homes. As can be appreciated, it is inconvenient and often burdensome for users to carry multiple wireless transmitters to control the many security and control systems they use.

In view of the undesired necessity of multiple transmitters to control multiple systems, it would be desirable to provide a universal, wireless controller which would allow a single device to emulate the transmissions of multiple wireless transmitters and, thus, overcome the disadvantages described above.

OBJECTS AND ADVANTAGES OF THE INVENTION

It is a first object and advantage of this invention to provide an electronic timepiece having a universal, wireless controller that overcomes the foregoing disadvantages.

It is another object and advantage of this invention to provide an electronic timepiece having a universal, wireless controller operating in a learning mode in which transmissions of a conventional, wireless transmitter are received and decoded by the wireless controller to enable the timepiece to emulate the transmissions of the wireless transmitter.

It is a further object and advantage of this invention to provide an electronic timepiece having a universal, wireless controller operating in a learning mode in which transmissions of a conventional, wireless transmitter are received, decoded, stored in memory and subsequently retrieved from memory thereby to enable the timepiece to emulate the transmissions of the conventional wireless transmitter as needed.

It is a still further object and advantage of this invention to provide an electronic timepiece having a universal, wireless controller which includes a preprogrammed storage device in which coded sequences which would otherwise be transmitted by a plurality of conventional, wireless transmitters are stored and subsequently retrieved to enable the timepiece to selectively emulate the transmissions of the wireless transmitters as needed.

Further objects and advantages of this invention will become more apparent from a consideration of the drawings and ensuing description.

SUMMARY OF THE INVENTION

The foregoing and other problems are overcome and the objects and advantages are realized by methods and apparatus in accordance with embodiments of this invention.

In accordance with one aspect of the present invention, a control device, which may include a controller which transmits wireless signals that control features of a plurality of systems, is provided. In one embodiment, the control device includes timekeeping functions and may be a watch, by way of example. In this embodiment, the timepiece may include a data store which contains a library of control signals. Each of the control signals emulate a coded message which controls features of a corresponding one of the plurality of systems. The timepiece also includes a device for selectively retrieving a control signal for a target system from the library. In one embodiment, the selective retrieving is performed in response to an input entered through a programmable interface. For example, the programmable interface may include a menu-based selection wherein various ones of the plurality of systems and associated features are presented to the user. The timepiece also includes a transmitter for transmitting the retrieved control signal to the target system to control one of the features of the target system.

In a preferred embodiment of the present invention, the timepiece may be a multiple operating mode device where, in a first operating mode, the timepiece displays a time of day and other timepiece-related information and, when in a second mode, the timepiece transmits the control signals to control preprogrammed features of a selected one of the plurality of systems.

In another embodiment, the control device, again, which may be a timepiece, further includes a receiver for receiving coded messages, a decoder for decoding the received coded messages and for extracting control signals received therein, and a device for storing the control signals in the library of control signals. In one aspect of this embodiment, the library of control signals may be detached from the timepiece so that an alternative library of control signals representing, for example, new embodiments of wireless transmitters may be added.

In accordance with another aspect of the present invention, a control device, which may be an electronic timepiece having a universal, wireless controller, emulates transmissions of wireless transmitters to control features of a plurality of systems. The universal, wireless controller of the timepiece operates in a learning operating mode and an emulation operating mode. In the learning operating mode the universal, wireless controller may display a list of wireless transmitters a user may wish to emulate. The user selects a wireless transmitter to be emulated from the list. In response to the selection of a transmitter, the controller prompts the user to activate the wireless transmitter for the selected system. Coded messages are then received by the timepiece from the activated transmitter. The controller of the timepiece then extracts digital sequences of bits encoded within the received coded message. The digital sequences of bits include command instructions and security sequence information (e.g., seeds, encryption keys or security codes)

to operate preprogrammed features of the system the user selected for emulation. The extracted command instructions and security sequence information are decoded and the decoded command instructions and security sequence information are stored in a memory location corresponding to a respective one of the plurality of systems. In one embodiment, the memory location is a location within a library of decoded command instructions and security sequence information for each of the plurality of system to be emulated. The learning operating mode is then completed and the selected transmitter and corresponding system are available for emulation.

In the emulation operating mode the electronic timepiece or other control device displays, for user selection, a list of wireless transmitters available for emulation. In response to the selection of an available system, stored, decoded command instructions and security sequence information are retrieved from the memory location corresponding to the selected system. The retrieved command instructions and security sequence information can then be transmitted to emulate the wireless transmitter and to control the preprogrammed features of the selected system. In one embodiment, the retrieved command instructions and security sequence information are encoded by an encoder so that the transmission of the electronic timepiece can not be intercepted and understood by unauthorized user.

In another aspect of the present invention, an electronic timepiece having a universal, wireless controller transmits control signals (e.g., the command instructions and security sequence information) to a subject security system wherein the subject security system does not immediately recognize and respond to the transmitted control signals. That is, the subject security system must be trained, or "taught", to recognize the control signals, or more precisely, to recognize command instructions and security sequence information contained within the control signals. In one embodiment of this aspect of the present invention, the subject security system operates in a learning operating mode in which control signals from the electronic timepiece are directed to the subject security system. The subject security system receives and decodes the control signals. During the learning operating mode, the decoded signals are associated with at least one preprogrammed feature of the subject security system. The subject security system then returns to a normal operating mode. A subsequent transmission of control signals from the electronic timepiece permits the electronic timepiece to control the associated, preprogrammed feature of the subject security system learned during a previous learning mode.

BRIEF DESCRIPTION OF THE DRAWINGS

The above set forth and other features of the invention are made more apparent in the ensuing Detailed Description of the Invention when read in conjunction with the attached Drawings wherein.

Identically labeled elements appearing in different ones of the above described figures refer to the same elements but may not be referenced in the description for all figures.

DETAILED DESCRIPTION OF THE PREFERRED EMBODIMENTS

As noted in the Background Section of this disclosure, wireless security and control systems are common features in many products. As a result of their broad use, standardization in the design of wireless transmitters in the form of key FOBs is occurring. Also, common transmit frequencies and encoding schemes are evolving to enable the low cost, high volume production of such transmitters. In accordance with the present invention, the standardization in design, transmit frequencies, and encoding schemes has enabled the use of a universal, wireless controller. The universal, wireless controller controls multiple security and control systems with transmissions from a single device. That is, the universal, wireless controller emulates the transmissions from other wireless transmitters such that the universal, wireless controller replaces multiple wireless transmitters which individually control individual security and control systems.

Figure 1:
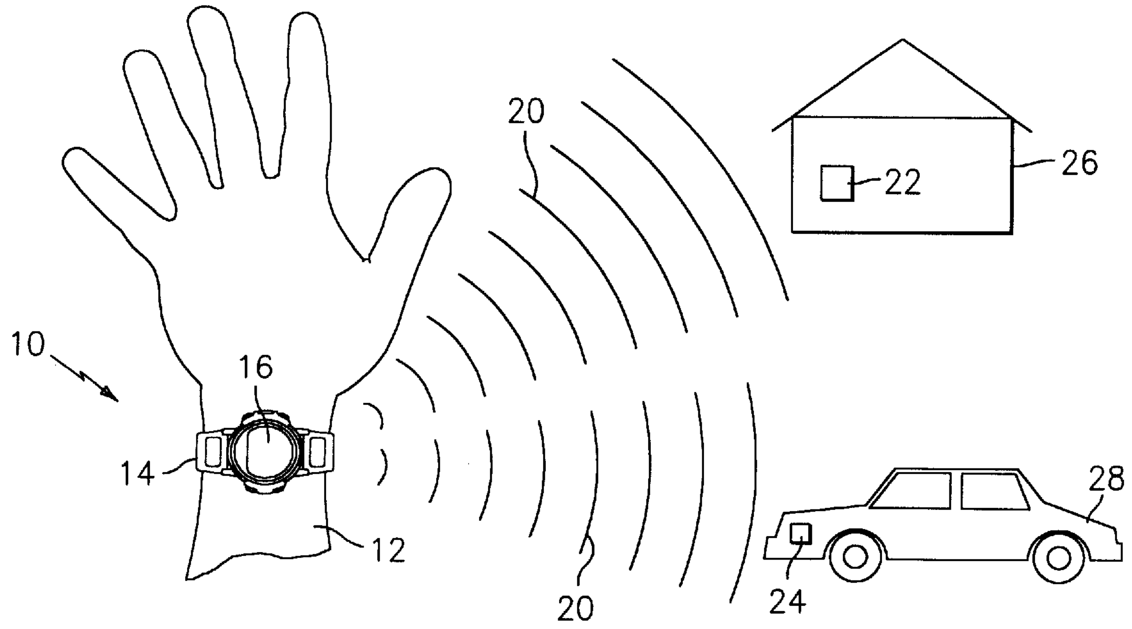
FIG. 1 is a simplified view of a preferred embodiment of the invention which illustrates a control device, such as an electronic timepiece having a universal, wireless controller feature for activating and deactivating exemplary preprogrammed functions of security systems within a house and a vehicle.
Figure 2:
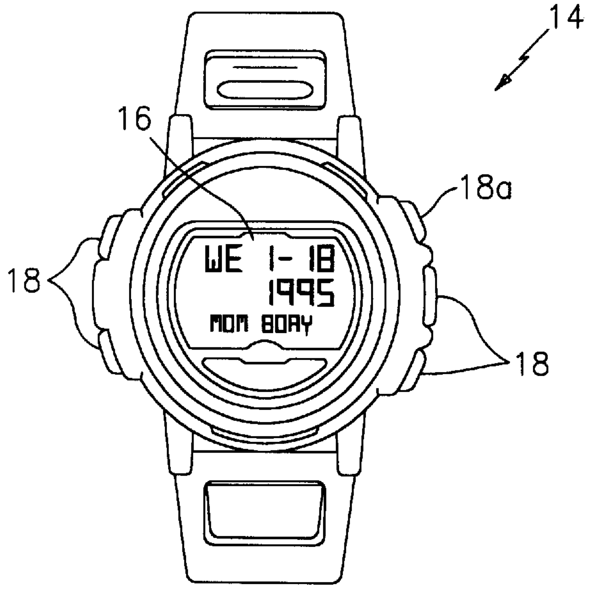
FIG. 2 is a plan view of a universal, wireless controller constructed in accordance with the present invention.

In a preferred embodiment of the present invention, a universal, wireless controller 10 may be attached to the wrist of a user 12. Referring to FIGS. 1 and 2, the universal wireless controller 10 is incorporated within the functionality of a multifunction electronic timepiece 14. The electronic timepiece 14 may include a dot matrix liquid crystal display (LCD) 16 for displaying a time of day, a date and other common timepiece functions. Additionally, the LCD 16 functions as an output device for displaying information from operating modes of the electronic timepiece 14. While shown in FIGS. 1 and 2 as being incorporated within a multifunction electronic timepiece, it should be appreciated that the universal, wireless controller 10 may be incorporated within, for example, other timepieces such as an analog timepiece, a digital timepiece, a combined digital and analog timepiece or, alternatively, within any suitably-sized, portable electronic device, such as a pager or a cellular phone.

The electronic timepiece 14 also includes buttons or pushers 18 which, as is known in the art, may be depressed to activate operating modes of the watch 14, to display status information of a currently selected mode, or to illuminate the LCD 16. Examples of such multimode, multifunctional electronic timepieces include U.S. Pat. No. 5,587,971 (Thinesen), U.S. Pat. No. 4,783,773 (Houlihan et al.), U.S. Pat. No. 4,780,864 (Houlihan), U.S. Pat. No. 4,283,784 (Horan), and U.S. Pat. No. 5,555,226 (Lizzi), all of which are assigned to the assignee of the present invention. The disclosures of these commonly assigned U.S. Pat. Nos. 5,587,971, 4,783,773, 4,780,864, 4,283,784 and 5,555,226 are incorporated by reference herein in their entireties.

In accordance with the present invention, the pushers 18 are employed to select a controller operating mode of the electronic timepiece 14. As can be appreciated, the pushers 18 can selectively activate and sequence through other operating modes of the electronic timepiece including, for example, a time-of-day mode, a chronograph mode and alarm setting modes. During an emulation operating mode of the controller, the user 12 may depress a predetermined one of the pushers 18, for example, button 18*a*, to transmit coded signals 20 from the electronic timepiece 14. The coded signals 20 are directed to, for example, security systems 22 and 24 within a house 26 and a vehicle 28, respectively. The security systems 22 and 24 are of a type which is controlled by a wireless transmission of commands within a predetermined frequency range. The security systems 22 and 24 receive the coded signals 20 which include commands to activate or deactivate preprogrammed functions of the security systems 22 and/or 24. For example, the coded signals 20 may include commands to unlock the doors of the vehicle 28 and/or to deactivate an alarm. As such, the user 12 employs the controller 10 of the electronic timepiece 14 to emulate transmissions of individual wireless transmitters for controlling the security systems 22 and 24.

In accordance with the present invention, the controller 10 emulates a wireless transmitter in at least two ways. In a first aspect of the present invention, an electronic timepiece having a universal, wireless controller operating in a learning mode receives and decodes transmissions from a plurality of wireless transmitters. As noted above, each of the plurality of wireless transmitters controls an individual system, for example, one of the security systems 22 and 24 of FIG. 1. By placing one of the plurality of wireless transmitters in close proximity to the universal, wireless controller, which is operating in the learning mode, the transmissions of the conventional transmitter are received, decoded and stored, i.e. "learned" by the universal, wireless controller. Once learned, the universal, wireless controller can transmit a signal representing the learned transmissions to emulate the operations of the conventional transmitter. The learning process is discussed in greater detail below.

Figure 3:
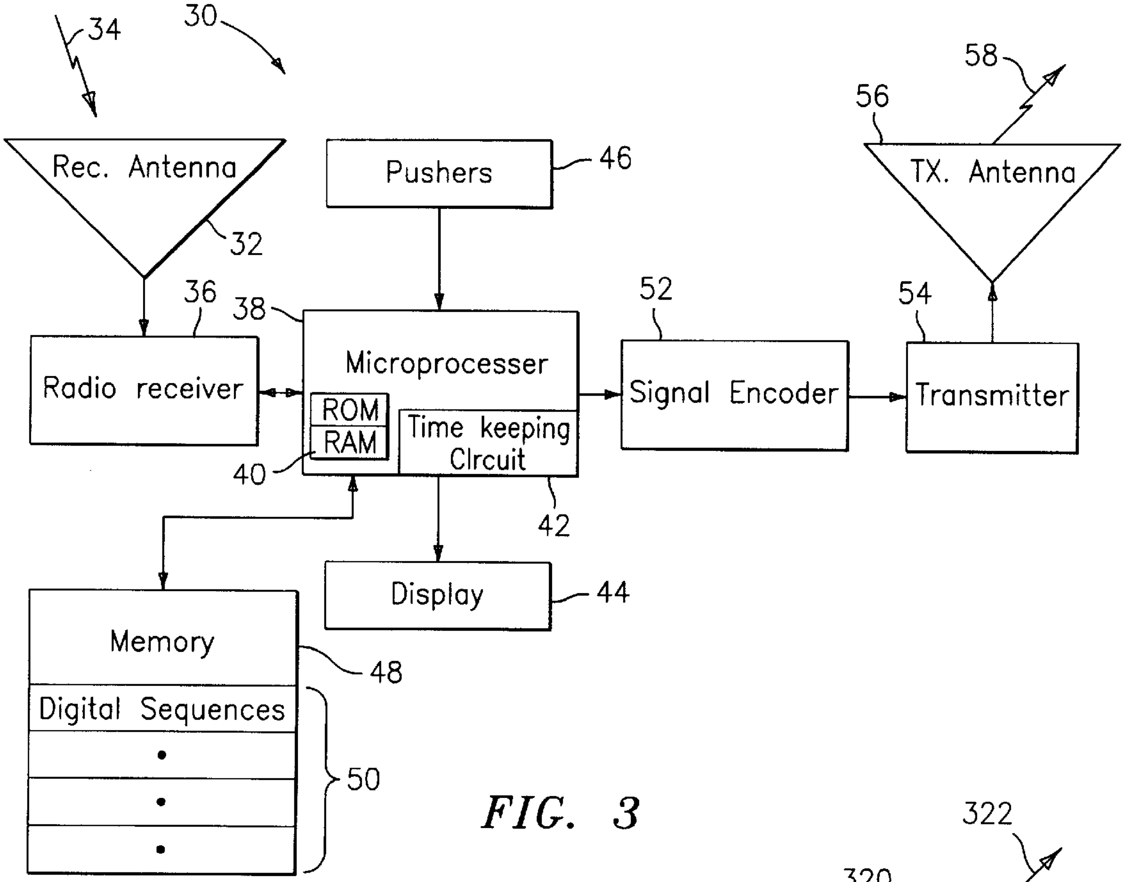
FIG. 3 is a block diagram of a universal, wireless controller constructed in accordance with the present invention.

Referring now to FIG. 3, a simplified schematic diagram of a learning mode electronic timepiece having a universal, wireless controller 30 is shown. The controller 30 includes an antenna 32 which receives, during the learning operating mode, electromagnetic radiation, hereinafter referred to as received signals 34, from a conventional wireless transmitter (not shown). A receiver 36 detects and receives the signals 34 from the antenna 32 and extracts an encoded digital sequence of bits from the received signal 34. The encoded digital sequence of bits include command instructions and security sequence information (e.g., seeds, encryption keys and security codes) for controlling various preprogrammed features of a system (e.g., one of the security and control systems 22 and 24 of FIG. 1) controlled by the wireless transmitter. As is discussed below, the digital sequences of bits are decoded and the command instructions and/or security sequence information incorporated therein are detected and stored for later transmission within a signal transmitted by the controller 30 to emulate the conventional, wireless transmitter.

The receiver 36 is designed to receive signals at a specific operating frequency or, alternatively, is designed to receive multiple frequencies. As should be appreciated, the ability to receive and extract signals of multiple frequencies permits the controller 30 to control multiple devices. For example, the wireless transmitters for security systems installed within vehicles operate at a different frequency than do the wireless transmitters for security systems installed within buildings such as houses and offices. By providing a receiver 36 which detects, receives and extracts signals within a broad range of operating frequencies, the controller 30 of the electronic timepiece controls a plurality of devices, i.e. controls the wireless transmitters for security systems installed in, for example, both vehicles and buildings. It should be appreciated, however, that the range of operating frequencies supported by the receiver 36 is limited by cost and size constraints. That is, the broader the range of operating frequencies received and decoded by the controller, the larger and more costly the receiver device 36 may be.

Additionally, security concerns may place further requirements upon the receiver 36 and the process of "learning" the transmission from a conventional, wireless transmitter. For example, the receiver 36 may be designed to limit its ability to learn transmissions of a transmitter that is not placed in close proximity, i.e. within about a few inches, of the electronic timepiece. The proximity requirement prevents others from using a similar controller to intercept the transmissions of transmitters in systems the user 12 would not otherwise have been given access to. Other security features may include, for example, a need to repeatedly learn transmissions of a wireless transmitter within a predetermined time period or a requirement of relearning the transmissions after a predetermined delay period of, for example, about 12 hours. The repeated learning and relearning requirements may prevent transmissions from being randomly intercepted, decoded and subsequently retransmitted by unintended users. As noted above, the learning process is discussed in greater detail below and, particularly, is discussed with reference to FIGS. 4A and 4B.

Referring again to FIG. 3, once the receiver 36 receives and extracts the encoded digital sequence of bits from the received signal 34, the encoded digital sequence is passed to a microprocessor 38 of the controller 30. The microprocessor 38 may be, for example, one of many commercially available microprocessors which includes a processor, ROM and RAM memories, input/output ports, various clocks, timers and display drivers within a single device. In one embodiment, the microprocessor 38 includes ROM and RAM memories 40 wherein computer programs, system parameters and variables necessary to support the operations of the controller 30 are stored. In particular, security features are implemented within the microprocessor 38, the ROM and the RAM memories 40 to prevent the unauthorized access to sensitive information of the controller 30 which could be used to defeat the controller 30.

As can be appreciated by those skilled in the art, the computer programs implemented within the microprocessor 38 include operating instructions suitable for decoding the encoded digital sequences of bits received from the receiver 36. In accordance with one embodiment of the present invention, the microprocessor 38 employs an appropriate one of a predetermined number of decoding algorithms to decode the encoded digital sequence of bits. The appropriate decoding algorithm is preferably selected at the beginning of the learning operating mode as the type of wireless transmitter to emulate is identified. The selection process is discussed in detail below.

Once decoded, the command instructions and/or security sequence information transmitted within the digital sequences are processed to enable the controller 30, and hence the timepiece 14, to emulate the operation of the wireless transmitter. As was discussed briefly above, the digital sequences include command instructions and security sequence information (e.g., seeds, encryption keys and security codes) associated with the wireless transmitter that permits the transmitter to control preprogrammed functions of a corresponding security and control system. By decoding the digital sequences of bits, the command instructions and security sequence information incorporated therein are detected. The controller 30 incorporates the detected command instructions and security sequence information within a signal that is transmitted, during an emulation mode, from the controller 30 to the security and control system. In essence, the transmitted signal controls at least one function of the security and control system by emulating the transmissions of the wireless transmitter. In accordance with one embodiment of the present invention, the detected command instructions and security sequence information are stored in a memory device which can be accessed to retrieve and to transmit the signals to the security and control system on an as needed basis. In another embodiment, the computer program may include operating instructions to encode the signal transmitted by the controller 30. This additional encoding operation provides, for example, secure transmissions which can not be received and processed by unintended systems.

In accordance with the present invention, the microprocessor 38 includes a timekeeping circuit 42. The timekeeping circuit 42 calculates a time of day and generates a time indicating signal representative of the time of day which permits the controller 30 to achieve the timekeeping function of the electronic timepiece. The microprocessor 38 processes the time indicating signal by, for example, passing the time indicating signal to a display 44 such as a liquid crystal display of a digital electronic timepiece, and/or by driving hands on a display dial of a quartz/analog timepiece. The microprocessor 38 may also pass signals to the display to indicate other timekeeping related information such as to display a date, to activate an alarm or to perform setting functions corresponding to the display of the time, the date or the alarm.

Figure 6:
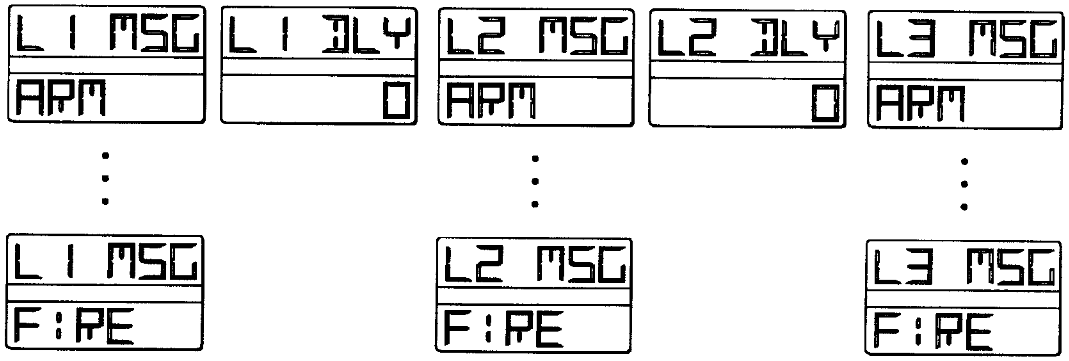
FIG. 6 illustrates an exemplary display of a device constructed in accordance with the present invention.

As is known from the disclosure of the above-identified, commonly-assigned patents, the display may prompt a user to selected from various operating modes of the controller 30. According to the present invention, the display may include prompts to sequence the controller 30 through various steps of the learning mode. In this regard, exemplary states of a user interface are shown in FIG. 6. Such prompting is well known in the art, and is more than adequately disclosed in those patents incorporated by reference herein.

As noted above, the microprocessor 38 includes a number of input/output ports. One or more of the input ports accept control inputs from a plurality of buttons, pushers or controls 46, e.g. the pushers 18 of FIG. 2. In the present invention, the controls 46 allow a user, for example, to select the operating modes of the controller 30 as well as to activate, or to respond to, various functions or status signals on the display 44. As is appreciated by those skilled in the art, and from the present disclosure, the function of one or more of the controls 46 may be redefined from one operating mode of the controller 30 to another. The redefinition of the controls 46 permits the maximum use of the number of controls of the controller 30.

The timepiece having the controller 30 further includes a memory 48 for storing parameters or variables to support various operations of the controller 30. For example, the microprocessor 38 passes the decoded digital sequences of bits, resulting from the process of learning the transmissions of a wireless transmitter, to the memory 48. As a result, the memory 48 may build or may already include and, thus, add to a collection or library 50 of decoded digital sequences of bits representative of the command instructions and security sequence information necessary to control numerous wireless transmitters. As can be appreciated, the storage capacity of the memory 48 and, thus, the number of wireless transmitters the timepiece can emulate, is limited by the type of device selected to implement the memory 48. In one embodiment, the memory 48 is a non-volatile memory which retains stored values if, for example, power is lost due to the need to change the timepiece's power source (e.g., a watch battery or power cell). Preferably, the nonvolatile memory is suitably sized to contain a plurality of decoded digital sequences to control at least the security and control systems desirable by a typical user, for example, the security and control systems within a plurality of vehicles and a home.

As can be appreciated, the microprocessor 38 includes an interface such as, for example, the software interface including a predetermined number of displays (FIG. 6) and which allows a user to select one of the plurality of stored digital sequence from the library 50 of sequences. The user may select one of the stored digital sequences by, for example, depressing one of the control buttons 46 (or pusher 18*a* of FIG. 2) during an emulation operating mode of the controller 30. The selected digital sequence is retrieved from the memory 48 for transmission to its corresponding security and control system. In one embodiment, depicted in FIG. 3, the microprocessor 38 passes the selected digital sequence to a signal encoder 52. The signal encoder 52 encodes, or encrypts, the selected digital sequence in a predetermined manner known in the art. For example, a unique sequence of bits is added to the data within the selected digital sequence. The unique sequence of bits conforms to a security encryption scheme employed by the controller 30 to ensure secure transmissions. Suitable devices for performing the encryption are known to those skilled in the art and include, for example, devices sold by Microchip Technology Inc. of Chandler, Ariz. In another embodiment, the encryption operation may be performed by a software routine executed by the microprocessor 38 either before storing or after retrieving the decoded digital sequences from the memory 48.

In response to the selection of a decoded, digital sequence from the memory 48, the digital sequence is encoded by the encoder 52 and passed to a transmitter 54. The transmitter 54 modulates a high frequency carrier, e.g., an about 315 MHz signal carrier, with the encrypted data stream to be transmitted to the corresponding security and control system. The carrier frequency is preprogrammed or tuned to the intended security control system and, in accordance with the present invention, generates different frequencies to support different security systems. Preferably, the transmitter 54 amplifies the modulated signal to a sufficient amplitude to ensure an acceptable range for the controller 30.

As is shown in FIG. 3, the transmitter 54 employs an antenna 56 to radiate the modulated electromagnetic radiation 58 into free space. For example, a simple loop antenna may be employed to provide a sufficient operating range for the controller 30. That is, by employing the simple loop antenna, the selected digital sequences are transmittable to control the plurality of security and control systems of its users. It should be appreciated that while shown as including the receive antenna 32 and the transmit antenna 56, the timepiece may include one antenna, coupled to both the receiver 36 and the transmitter 54. The single antenna performs both the receive and transmit functions. The modulated electromagnetic radiation 58 transmitted by the controller 30 emulates the transmissions of the wireless transmitter, thus causing the electronic timepiece having controller 30 to control a subject security system.

As should be appreciated, it is also within the scope of the present invention to provide an electronic timepiece having a universal, wireless controller for transmitting control signals (e.g., the command instructions and security sequence information) to a subject security system wherein the subject security system does not immediately recognize and respond to the transmitted control signals. That is, the subject security system must "learn" to recognize the control signals, or more precisely, to recognize security sequence information contained within the control signals. In one embodiment of this aspect of the present invention, the subject security system enters, for example, a learning operating mode and control signals from the electronic timepiece are directed to the subject security system. The subject security system receives and decodes the control signals. The decoded signals are then associated with at least one specific preprogrammed feature of the subject security system. The subject security system then returns to a normal operating mode. A subsequent transmission of control signals from the electronic timepiece permits the electronic timepiece to control the associated, preprogrammed feature of the subject security system learned during a previous learning mode.

Figure 4A:
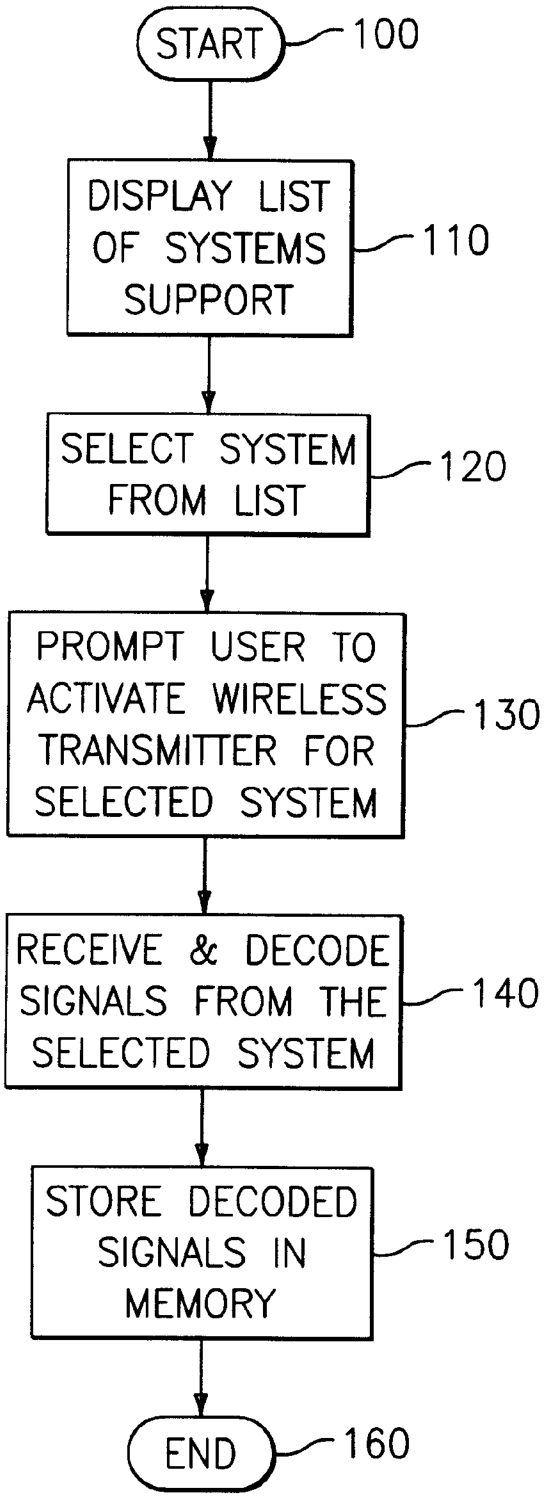
FIG. 4A is a flowchart of a learning operating mode of the universal, wireless controller of FIG. 3.

Referring now to FIG. 4A, there is shown a flowchart which illustrates a learning operating mode of the universal, wireless controller 30 incorporated within the electronic timepiece 14 of FIG. 2. The learning operating mode begins, at Block 100, when a user chooses the learning operating mode from one of the plurality of operating modes of the controller. Control immediately passes to Block 110 where a list of security and control systems supported by controller 30 is shown on the display 44. The list includes a plurality of security systems that are controlled by wireless transmitters whose transmissions can be emulated by controller 30. That is, the systems in the list employ an algorithm to encode their transmissions that can be decoded by the universal, wireless controller 30, i.e. an associated one of a plurality of decode algorithms stored in the memory of the microprocessor 38.

At Block 120 a user selects the system they wish to emulate from the list. The selection of a system may be menu driven (FIG. 6), that is, the display 44 may show the systems available to be emulated and include the ability to, for example, scroll through the list or employ the pushers 46 to highlight and to select a system. Alternatively, the pushers 46 may be implemented to allow the selection of a numeric entry which corresponds to the position of a system within the displayed list.

At Block 130, the user is directed to activate the wireless transmitter for the system selected at Block 120. The user may be directed by, for example, a prompt, flag or message which appears on the display 44. In response to the prompt, the user activates the wireless transmitter such that the signals 34 are transmitted by the selected device and received by the universal, wireless controller 30. An optional feature of the learning process is to require that the wireless transmitter to be learned is held in close proximity the electronic timepiece during activation. By requiring that the wireless transmitter be activated within, for example, a few inches of the electronic timepiece prevents an unauthorized party from intercepting signals from a wireless transmitter activated nearby during routine operation. Alternatively, a security feature may be included which requires that the wireless transmitter be activated a predetermined number of times, e.g., 10 times, before previously learned transmissions are stored for use. This and similar such security features are discussed in greater detail below.

At Block 140, the signals 34 from the selected wireless transmitter are received by the controller 30. The received signals 34 are processed by the microprocessor 38 of the controller 30 which decodes the received signals by employing the algorithm which may be used to encode the transmission, i.e. the associated decode algorithm for the selected system. Digital sequences which were encoded within the signals 34 are then extracted by the microprocessor 38. In one embodiment, the decoded digital signals are stored in the memory device 48. Preferably, the decoded digital signals are stored as a collection, or library 50, of decoded digital signals (Block 150) which may be accessed in another operating mode and transmitted to emulate the operation of the wireless transmitter. Once the digital signals are decoded the learning mode is complete (Block 160).

Figure 4B:
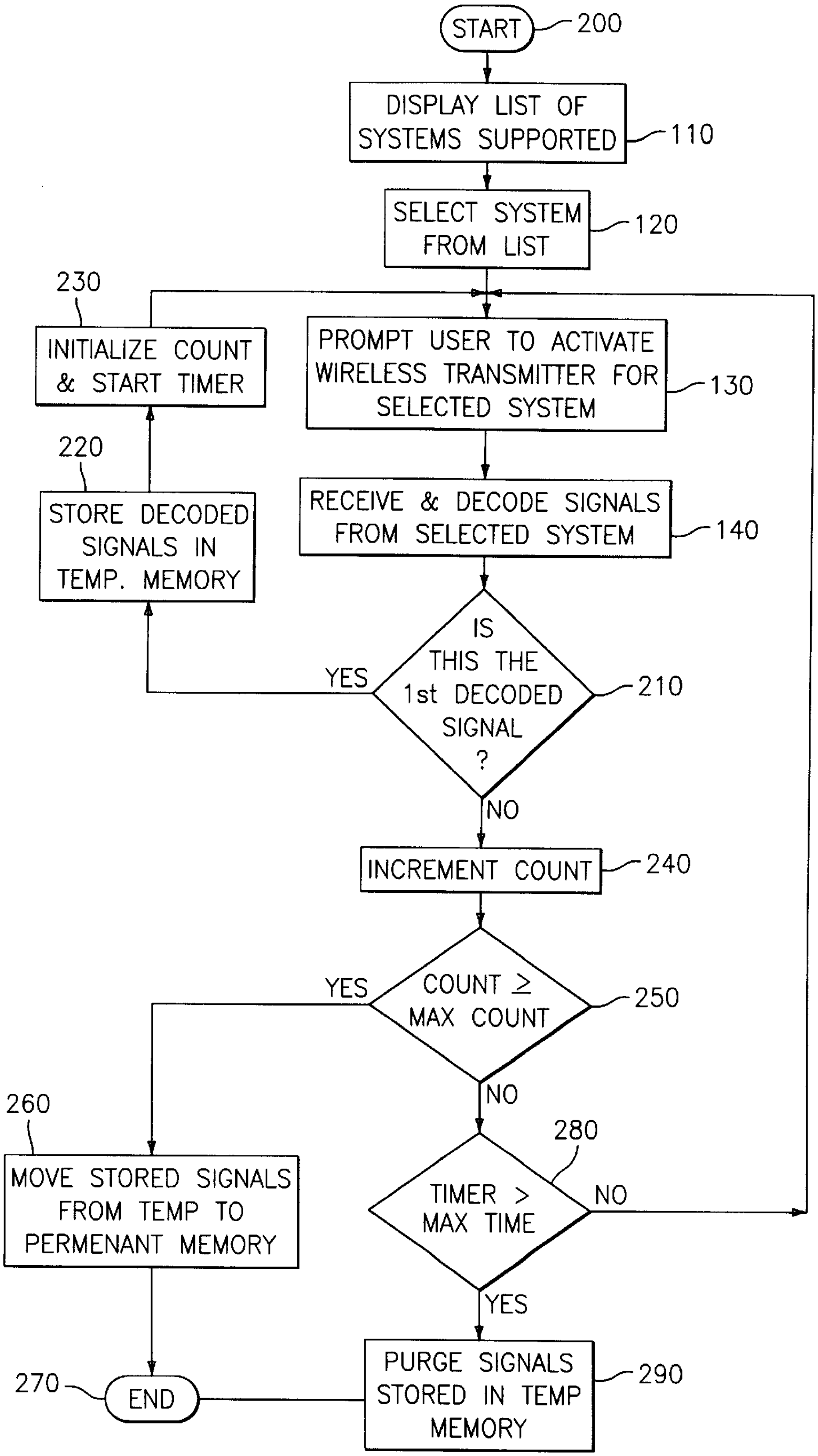
FIG. 4B is a flowchart of an alternative learning operating mode of the universal, wireless controller of FIG. 3.

An alternative learning operating mode is presented in FIG. 4B. The flowchart of FIG. 4B includes steps discussed above with relation to FIG. 4A (depicted with the same block numbers). The alternative learning mode illustrates an added security feature within the learning mode of FIG. 4A. That is, the alternative learning mode requires that transmissions from a wireless transmitter to be emulated be learned a predetermined number of times within a predetermined time period. The repeated learning process substantially ensures that the controller 30 is not used to learn transmissions from security systems that the user would not otherwise have access to. Therefore, if a transmission is not repeatedly learned the predetermined number of times within the predetermined time period, then the previously decoded digital sequences of bits are purged from memory. On the other hand, if the transmission is repeatedly learned as required above, then the decoded digital sequences are saved in memory 48 and the wireless transmitter is emulated as needed.

The alternative learning process begins at Block 200, when a user chooses the learning operating mode from one of the plurality of operating modes of the controller. Control immediately passes to Block 110 where, as was discussed above, a list of security and control systems supported by the universal, wireless controller 30 is shown on the display 44. At Block 120 the user selects the system they wish to emulate from the list. As above, the selection of the system to emulate may be menu driven.

At Block 130, the user is directed to activate the wireless transmitter for the system selected at Block 120. In response to the direction, the user activates the wireless transmitter such that the signals 34 are transmitted by the selected device and received by the universal, wireless controller 30. At Block 140, the signals 34 from the selected wireless transmitter are received by the controller 30. The received signals 34 are processed by the microprocessor 38 of the controller 30 which decodes the received signals 34 by employing a decryption algorithm suited to decode signals from the selected wireless transmitter. Digital sequences which were encoded within the signals 34 are then extracted by the microprocessor 38. At Block 210 a decision is made whether the signals received and decoded are the first signals decoded for the selected system. If the signals received and decoded are the first signals for the selected system, then control passes along a "YES" path from Block 210 to Block 220.

At Block 220 the decoded digital signals are stored in a temporary memory location of a memory device. Once the first digital signals are stored control passes to Block 230 where a counting and a timing process is initialized. For example, a variable representing the current number of signals decoded for the selected system is initialized (e.g., a variable M is set to 1), and a variable representing an elapsed time is initialized (e.g., an internal timer is started and a variable N is assigned to hold a value representing the elapsed time). Once the initialization is complete, control passes from Block 230 back to Block 130. The processes within Blocks 130 and 140 are then repeated such that the user is prompted to reactivate the wireless transmitter for a next decoding process.

The decision at Block 210 is again evaluated to determine whether the signals received and decoded are the first signals decoded for the same selected system. If the same wireless transmitter was reactivated, then control passes along a "NO" path from Block 210 to Block 240. However, if a second system/wireless transmitter was activated instead of the first selected system, then control passes to Block 220 where the second transmitter's decoded signals overwrite the first signals in the temporary memory (Block 220) and the initialization process is performed (Block 230).

Assuming, however, that the same or first selected system was reactivated and its transmissions decoded, then, as noted above, control passes from Block 210 to Block 240. At Block 240, the counting variable, variable M, is incremented to represent that a next set of signals were decoded. In this example, variable M would be incremented from, for example, a value of 1 to a value of 2. At Block 250 the counting variable (M) is compared to a predetermined maximum value of, for example, about three (3). The predetermined maximum value represents the number of times signals from a wireless transmitter a user wishes to emulate with the universal, wireless controller must be transmitted and decoded such that the digital sequences of the wireless transmitter are stored for later transmission/emulation. For example, and as is shown in FIG. 4B (Block 250), if the counting variable (M) is greater than or equal to a maximum count variable (Max Count), then control passes along a "YES" path from Block 250 to Block 260. At Block 260, the decoded signals previously stored in the temporary memory (at Block 220 discussed above) are moved to a more permanent memory location, for example, the decoded digital signals are moved from the temporary memory location of the memory device to the library of decoded digital signals 50 referred to above. The library of decoded digital signals 50 is accessible when the universal, wireless controller 30 is activated to emulate a previously learned wireless transmitter. Control passes from Block 260 to Block 270 where the alternative learning process is completed.

Referring again to Block 250, if the counting variable (M) is less than the maximum count variable (Max Count), then control passes from Block 250 along a "NO" path to Block 280. At Block 280 the value of the elapsed time (variable N) is compared to a predetermined maximum elapsed time value of, for example, about twenty (20) seconds. The predetermined maximum elapsed time value represents the total elapsed time given the user to reactivate the wireless transmitter the user wishes to emulate with the controller 30. The elapsed time includes, in this example, the time required to receive and decode the separate M transmissions, as discussed above. Therefore, if the process of separately transmitting the M transmissions has not yet met the maximum count threshold, but the elapsed time has reached the maximum allotted time threshold, then control passes along the "YES" path from Block 280 to Block 290 where the decoded signals stored in the temporary memory location (Block 220) are purged. Once the signals are purged from the temporary memory location, then control passes to Block 270 where the alternative learning process ends. If, however, the elapsed time has not reached the maximum allotted time threshold, then control passes along the "NO" path from Block 280 back to Block 130 where the alternative learning process continues for a next set of received signals.

It should be appreciated that it is within the scope of the present invention to provide variations to the above described learning modes which include, for example, a security feature wherein the wireless transmitter must be activated a predetermined number of times, e.g., 10 times, before previously learned transmissions are stored in memory for later retrieval and use. In another exemplary learning mode, transmissions of a wireless transmitter are learned by, for example, the learning operating mode discussed with reference to FIG. 4A with the exception that the decoded signals are stored in a temporary memory location. If the transmissions of the wireless transmitter are not relearned within a predetermined time period of, for example, about 12 hours, then the decoded signals are deleted from the temporary memory location. In another embodiment, the predetermined time period within which relearning is required is, itself, repeated a predefined number of times. That is, the transmissions are initially learned and stored in a temporary memory location. Within 12 hours the transmissions must be relearned a first time otherwise the temporary memory location is purged. Within a next 12 hour period the transmissions must again be relearned otherwise the memory location is purged. Thus, as is apparent, the relearning process may be repeated an appropriate number of times to ensure that an unauthorized user who, for example, may have had access to a particular wireless transmitter for a limited period of time can not, during that limited period of time, learn the transmissions using the universal wireless transmitter. It should also be appreciated that while described above in terms of specific steps and functional blocks, one skilled in the art may implement the learning process (FIG. 4A), the alternative learning process (FIG. 4B), and/or the other exemplary learning processes described above to include more or less steps than are shown and described herein. For example, if the wireless transmitter that the user is seeking to emulate employs multiple functional keys, then the learning process is repeated for each key or functional process of the wireless transmitter such that the universal, wireless controller 30 emulates all of the functionality of the wireless transmitter.

Figure 5:
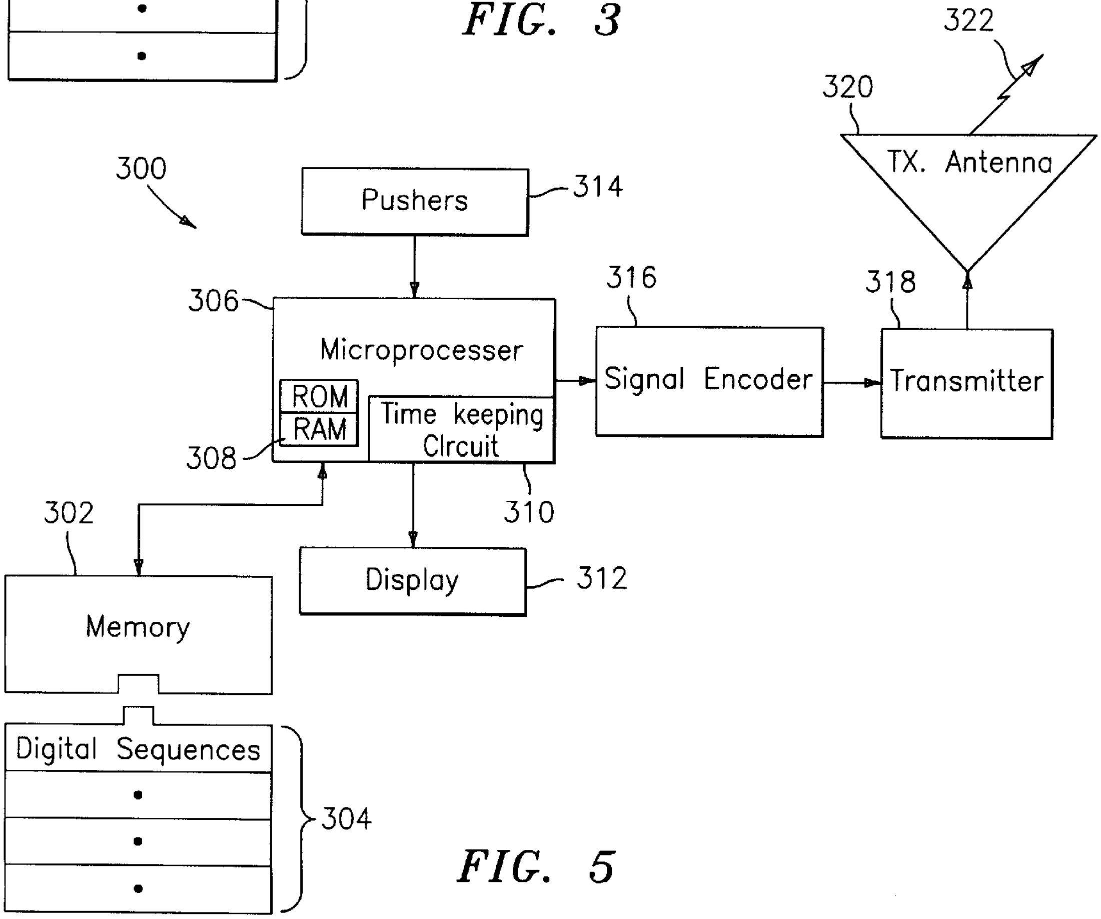
FIG. 5 is a block diagram of a preprogrammed universal, wireless controller constructed in accordance with the present invention.

In a second aspect of the present invention, illustrated in FIG. 5, a universal, wireless controller 300 has a preprogrammed storage device 302 which contains coded sequences of bits that represent transmissions, i.e. the command instructions and security sequence information, for a plurality of conventional wireless transmitters. For example, the coded sequences may represent the command instructions and security sequence information of a number of conventional wireless transmitters which control security systems for, by example, vehicles and buildings. In one embodiment, the coded sequences are stored in a library of coded sequences 304 which represent the command instructions and security sequence information of various systems controlled by the wireless transmitters. As in the first aspect of the present invention (i.e., the learning mode controller), the coded sequences may be subsequently retrieved from the preprogrammed storage device 302 to enable the universal, wireless controller 300 to emulate the transmissions of a selected one of the plurality of conventional, wireless transmitters as needed.

In one embodiment of the present invention, the library of coded sequences 304 is detachably coupled to the data store 302 such that the library 304 may be periodically replaced. The periodic replacement of the library 304 allows a user of the universal, wireless controller 300 to update the various command instructions and security sequence information stored in the library 304. In this way, the user can be assured that the universal, wireless controller 300 can emulate the transmissions of each available wireless transmitter. That is, if a security and control system is purchased by the user after the universal, wireless controller was purchased the user can also purchase a replaceable library which contains the appropriate command instructions and security sequence information for each system they own, including this later purchased system. In this aspect of the present invention, the replaceable library 304 may be, for example, included on a smartcard or PCMCIA card.

In another aspect of the present invention an electronic timepiece having a universal wireless controller may further include a device for receiving command instructions and security sequence information transferred to the timepiece from, for example, a special purpose computer system. Commonly assigned, U.S. Pat. No. 5,488,571 issued Jan. 30, 1996; U.S. Pat. No. 5,535,147 issued Jul. 9, 1996; and U.S. Pat. No. 5,815,127 issued Sep. 29, 1998, all to Jacobs et al., describe systems for transferring data from a CRT video display monitor on a personal computer to an electronic wristwatch by the use of light pulses. The disclosure of these commonly assigned, U.S. Pat. Nos. 5,488,571, 5,535,147, and 5,815,127 are incorporated by reference herein in their entireties.

As described in these commonly assigned, U.S. patents the face of the wristwatch has an optical sensor which is connected to a UART (universal asynchronous receiver/transmitter). The wristwatch receives a serial bit transmission in the form of light pulses at a fixed bit rate. An optical signal converter cooperates with the personal computer, the UART and a microprocessor of the wristwatch to transfer or download new and/or updated command instructions and security sequence information as light pulses and to convert the received light pulses into binary coded data. Preferably, the binary coded data is stored in a memory device such as, for example, the above described library of coded sequences 304. In this way periodic updates or replacements of command instructions and security sequence information may be performed on the universal, wireless controller.

In another embodiment, the device for receiving command instructions and security sequence information transferred to the timepiece includes circuitry which responds to call signaling and messaging typically incorporated in radio paging systems. In this respect, the electronic timepiece having the universal wireless controller further includes a radio paging receiver of the type described in a commonly assigned, copending U.S. patent application Ser. No. 09/157,346, filed Sep. 18, 1998. The disclosure of this commonly assigned, copending U.S. patent application is incorporated by reference herein in its entirety. In this embodiment new and/or updates to existing command instructions and security sequence information are transmitted to the electronic timepiece via a paging message and, preferably, are stored in a memory device such as, for example, the above described library of coded sequences 304.

Referring again to FIG. 5, the universal, wireless controller 300 includes a microprocessor 306 which may be, for example, one of many commercially available processors which includes a processor, ROM and RAM memories, input/output ports, various clocks and timers and display drivers in a single device. The microprocessor 306 includes ROM and RAM memories 308 wherein are stored computer programs, system parameters and variables necessary to support the operations of the controller 300. As can be appreciated, the microprocessor 306 of this embodiment is similar to the microprocessor 38 discussed above with relation to the leaning mode universal, wireless controller 30. In particular, the microprocessor 300 includes a timekeeping circuit 310 for calculating a time of day and for generating a time indicating signal representative of the time of day. As such, the controller 300 operates as a timepiece. As was discussed above with reference to the microprocessor 38 of FIG. 3, the microprocessor 300 processes the time indicating signal by, for example, passing the signal to a display 312. Additionally, the microprocessor 300 passes signals to the display 312 to indicate other timekeeping related functions such as, for example, a date, time or alarm setting functions.

As is known from the disclosure of the above-identified commonly-assigned patents (i.e., U.S. Pat. Nos. 5,587,971, 4,783,773, 4,780,864, 4,283,784, and 5,555,226) the display 312 may by employed to prompt a user to selected from various operating modes of the controller 300. The user may select a mode or feature of the controller 300 by depressing or otherwise activating pushers 314 on the controller 300 (e.g., the pushers 18 of FIG. 2). According to the present invention, the display 312 and pushers 314 may be used to sequence the controller 300 through various operating modes which include, for example, an emulation mode.

In the emulation mode, digital sequences of bits representing information within transmissions of one of the conventional wireless transmitters, i.e. the command instructions and security sequence information corresponding thereto, are retrieved from the library 304 of the memory 302 by the microprocessor 306 and passed to a signal encoder 316. The signal encoder 316 encodes, or encrypts, the retrieved digital sequences in a predetermined manner. For example, a unique sequence of bits may be added to the data within the retrieved digital sequences. The unique sequence of bits conforms to a security encryption scheme employed by the controller 300 to ensure secure transmissions. Suitable devices for performing the encryption are known to those skilled in the art. In another embodiment, the digital sequences stored in the library 304 are already encoded and, thus, the signal encoder 316 and its corresponding encryption operation are not needed.

Once the retrieved digital sequence is encoded, the encrypted digital sequence is passed to a transmitter 318. The transmitter 318 modulates a high frequency carrier, e.g., an about 315 MHz signal carrier, with the encrypted data stream to be transmitted to the corresponding security and control system. The carrier frequency is preprogrammed, or tuned, to the intended security control system and, in accordance with the present invention, generates different frequencies to support different security systems. Preferably, the transmitter 318 amplifies the modulated signal to a sufficient amplitude to ensure an acceptable range for the universal, wireless controller 300.

As is shown in FIG. 5, the transmitter 318 employs an antenna 320 to radiate the modulated electromagnetic radiation 322 into free space. In accordance with this aspect of the present invention, the modulated electromagnetic radiation 322 is directed at a security system which is controlled with the digital sequences retrieved from the library of sequences 304 stored in the controller 300. As a result, controller 300 controls the security system corresponding to the retrieved and encoded digital sequences such that the generated signal activates or deactivates preprogrammed features of security system.

Although described in the context of preferred embodiments, it should be realized that a number of modifications to these teachings may occur to one skilled in the art. By example, and as discussed above, the teachings of this invention are not intended to be limited to any specific electronic timepiece embodiment and may be included in either a digital electronic timepiece or a quartz/analog timepiece or pager/watch, for example. Therefore, while the invention has been particularly shown and described with respect to preferred embodiments thereof, it will be understood by those skilled in the art that changes in form and details may be made therein without departing from the scope and spirit of the invention.

What is claimed is:

1. A method by which a universal controller emulates at least one control signal from each of a plurality of wireless transmitters, wherein each wireless transmitter controls at least one function of a respective system, further wherein at least one of the control signals from its respective wireless transmitter is an encrypted control signal and wherein decoding of the encrypted control signal is necessary for the encrypted control signal to be learned by the universal remote for later emulation, the method comprising the steps of:

storing a plurality of codes in a memory of the universal controller, each of the plurality of codes associated with a decoding algorithm, wherein at least one of the decoding algorithms will enable decoding of the encrypted control signal;

activating the wireless transmitter having the encrypted control signal so as to permit the universal controller to receive the encrypted control signal from the wireless transmitter;

receiving the encrypted control signal, decoding the encrypted control signal and extracting digital sequences encoded within the control signal, the digital sequences being comprised of command instructions and security sequence information to operate a function of a corresponding one of the plurality of systems;

storing the decoded command instructions and security sequence information in a selected memory location of the universal controller; and in an emulation mode:

in response to a selection by the user of an emulatable wireless transmitter, retrieving the stored, decoded command instructions and security sequence information from the memory location corresponding to the selected emulatable wireless transmitter; and controlling the respective function of the corresponding system by transmitting at least the retrieved command instruction and security sequence information.

2. The method as claimed in claim 1, including the steps of:

displaying a list of the emulatable wireless transmitters available for emulation to the user; and in response to a selection by the user of a displayed emulatable wireless transmitter, prompting the user to activate the external wireless transmitter corresponding to the emulatable wireless transmitter.

3. The method as set forth in claim 1, including the step of providing a detachably coupled memory device that stores therein the plurality of codes each of which is associated with a decoding algorithm.

4. The method as set forth in claim 3, including the step of purchasing, separate from the purchase of the universal controller, the detachably coupled memory device that stores therein the plurality of codes each of which is associated with a decoding algorithm.

5. The method as claimed in claim 1, including the step of optically downloading at least one code out of the plurality of codes from a personal computer to the memory of the universal controller.

6. The method as claimed in claim 1, including the step of having the universal controller receive the at least one code out of the plurality of codes over a paging network.

7. The method as set forth in claim 1, including the step of encoding the retrieved command instructions and security sequence information prior to the step of transmitting the retrieved command instruction and security sequence information so as to control the respective function of the corresponding system.

8. The method as set forth in claim 1, wherein the learning operating mode is repeated a predetermined number of times within a predetermined time period before the emulatable wireless transmitter is available for emulation.

9. A universal controller for emulating at least one control signal from each of a plurality of wireless transmitters, wherein each wireless transmitter controls at least one function of a respective system, further wherein at least one of the control signals from its respective wireless transmitter is an encrypted control signal and wherein decoding of the encrypted control signal is necessary for the encrypted control signal to be learned by the universal remote for later emulation, the universal controller comprising:

first memory for storing a plurality of codes, each of the plurality of codes associated with a decoding algorithm, wherein at least one of the decoding algorithms will enable decoding of the encrypted control signal;

an antenna for receiving the encrypted control signal from the wireless transmitter when the wireless transmitter having the encrypted control signal is activated;

means for decoding the encrypted control signal and extracting digital sequences encoded within the control signal, the digital sequences being comprised of command instructions and security sequence information to operate a function of a corresponding one of the plurality of systems;

second memory for storing the decoded command instructions and security sequence information;

means for retrieving the stored, decoded command instructions and security sequence information corresponding to the selected emulatable wireless transmitter from the second memory; and wherein the antenna can transmit at least the retrieved command instruction and security sequence information so as to control the respective function of the corresponding system.

10. The universal controller as claimed in claim 9, comprising:

a display; and means for displaying on the display a list of the emulatable transmitters available for emulation to a user.

11. The universal controller as claimed in claim 10, comprising:

a detachable memory, the detachable memory for storing therein the plurality of codes each of which is associated with a decoding algorithm.

12. The universal controller as claimed in claim 11, comprising:

means for detachably coupling, to the universal controller, the detachable memory.

13. The universal controller as claimed in claim 9, including means for encoding the retrieved command instructions and security sequence information prior to transmitting the retrieved command instruction and security sequence information so as to control the respective function of the corresponding system.

14. The universal controller as claimed in claim 9, wherein the universal controller is incorporated into a wristworn device.

15. The universal controller as claimed in claim 9, wherein the wristworn device is a watch.

* * * * *